United States Patent

[11] 3,592,172

| [72] | Inventor | Otis D. Treiber<br>3080 Stanley Ave., Santa Cruz, Calif. 95060 |
|---|---|---|
| [21] | Appl. No. | 794,555 |
| [22] | Filed | Jan. 28, 1969 |
| [45] | Patented | July 13, 1971 |

[54] INTERNAL COMBUSTION RECIPROCATING ENGINE
8 Claims, 11 Drawing Figs.

[52] U.S. Cl. .................................. 123/30 D, 123/32 C, 123/32 SP
[51] Int. Cl. .................................. F02b 19/16
[50] Field of Search .................................. 123/32 SP, 32, 32.2, 32.3, 30.2, 30.21

[56] References Cited
UNITED STATES PATENTS

| 1,866,300 | 7/1932 | French | 123/32 |
| 1,984,836 | 12/1934 | Kreis | 123/32 |
| 2,061,826 | 11/1936 | Bremser | 123/32 |
| 2,091,894 | 8/1937 | Treiber | 123/32 |
| 2,172,526 | 9/1939 | Treiber | 123/32 |
| 2,766,739 | 10/1956 | Kosche | 123/32 |
| 2,800,118 | 7/1957 | Scherenberg | 123/32 |
| 3,107,658 | 10/1963 | Meurer | 123/32 |
| 3,304,922 | 2/1967 | Hideg | 123/32 |
| 2,577,558 | 12/1951 | Zelezny | 123/65 A |
| 2,744,506 | 5/1956 | Reynolds | 123/65 V 3 |
| 2,782,777 | 2/1957 | Jasper | 123/65 A |

*Primary Examiner*—Laurence M. Goodridge
*Attorney*—Frease and Bishop

ABSTRACT: An internal combustion reciprocating engine having a substantially round combustion chamber in one side of the cylinder at the top thereof and formed partly in the cylinder and partly in the piston near the upper end thereof. The combustion chamber is preferably spherical, although it may be drum shaped.

Fuel is sprayed into the combustion chamber, directed away from the relatively cool combustion chamber walls and preferably toward the cylinder head, and is ignited during the early part of the fuel injection period by any of many artificial ignition means, such as a spark, stream of sparks, hot sparks, glow plug, cold plug, torch, hot spot or pin, various kinds of catalysts, etc.

The top of the piston and top of the cylinder are both located at an angle to the axis of the cylinder, with the long side of the piston and the cylinder on the combustion chamber side.

Movement of the piston produces high turbulence of the combustion air equivalent to 1 ½ to 5 revolutions of eddying of the air past the fuel spray nozzle during the maximum duration of fuel injection.

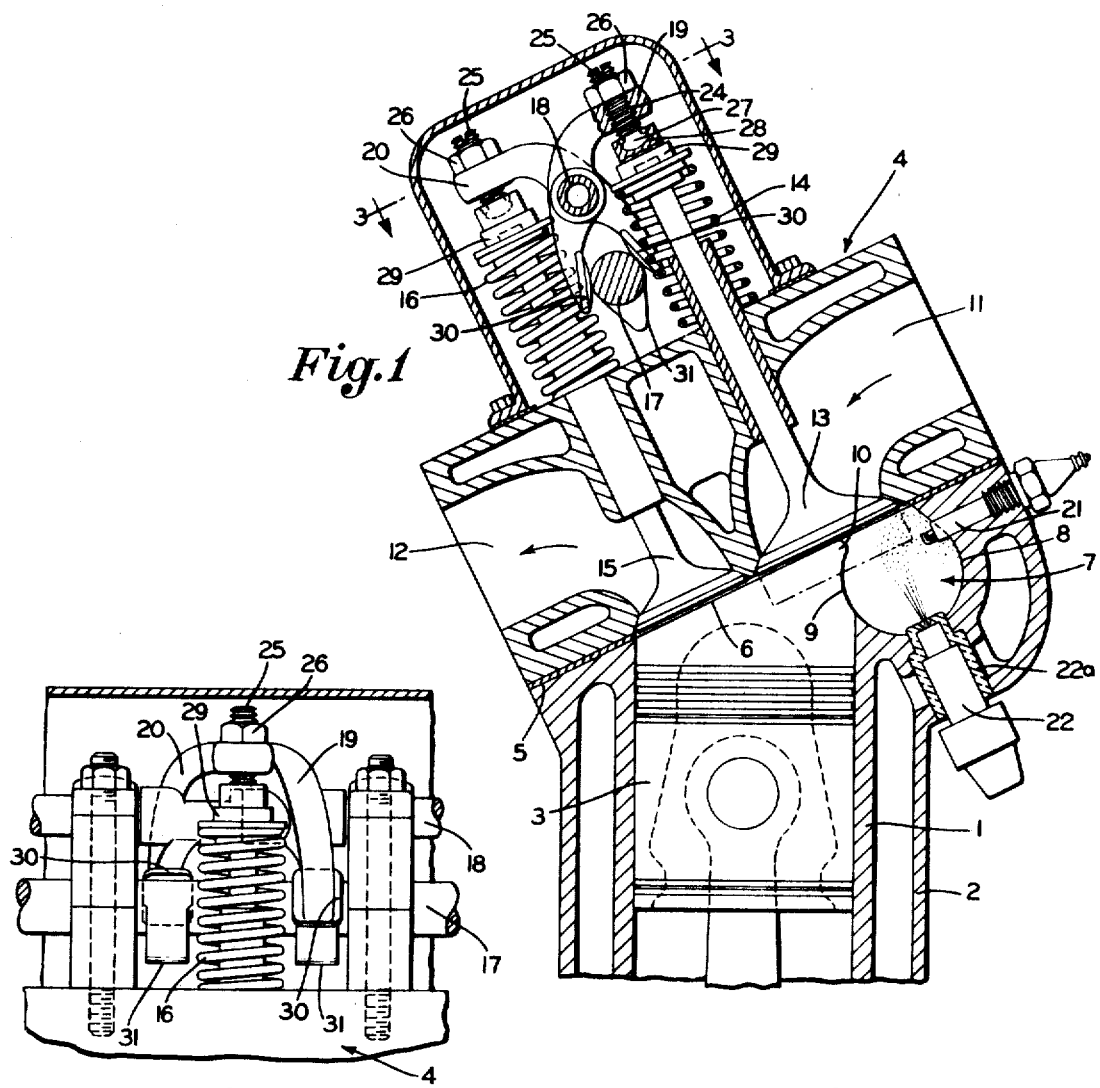
Fig.1
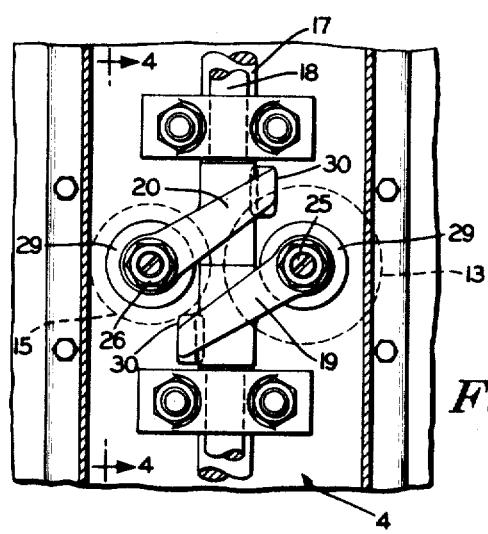
Fig.4
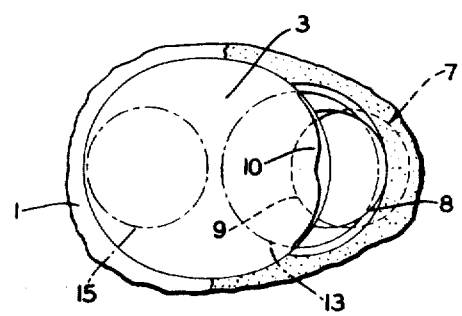
Fig.2
Fig.3
INVENTOR.
Otis D. Treiber
BY
Frease & Bishop
ATTORNEYS INVENTOR.
*Otis D. Treiber*
BY
*Frease & Bishop*
ATTORNEYS

INTERNAL COMBUSTION RECIPROCATING ENGINE

BACKGROUND OF THE INVENTION

1. Field of the Invention

The invention relates to internal combustion engines of the reciprocating-type in which liquid fuel is sprayed into the combustion chamber and artificially ignited therein, and more particularly to such an engine in which the combustion chamber is round, preferably spherical, and is located in one side of the cylinder at the upper end thereof, partly in the cylinder and partly in the adjacent side of the piston, and in which the upper ends of the piston and of the cylinder are located at an angle to the axes thereof.

This development is based on the knowledge that thermal efficiency is optimum in a single expansion internal combustion engine when the compression ratio is about 11 to 1. This is too low for compression ignition engines to be started with conveniently available fuels, and too high for practical gasoline engines which mix the liquid fuel into combustion air outside of the combustion chamber.

Thus, the problems to solve in this project are: mixing air and fuel, ignition and proper combustion, which are not simple problems. Combustion must utilize a very high percentage of the combustion air at the proper time and rate for good combustion and power capacity. Moreover, the fuel spray must be such that none of the spray droplets come against or near the relatively cool combustion chamber walls.

The fuel must be ignited at the proper time and mixed with the combustion air at the right time and rate to unite the entire amount of fuel atoms with nearly the entire amount of available oxygen. All this must be done in a very small fraction of a second—about 0.001 second at 3,000 r.p.m. Obviously this is a colossal mixing operation in a very short time.

The construction and arrangement of the present invention overcomes these difficulties by mixing the liquid fuel with the combustion air and producing high turbulence thereof within the combustion chamber.

2. Description of the Prior Art

The most pertinent prior art of which I know are my prior patents as follows: U.S. Pat. No. 1,960,093, issued May 22, 1934; No. 2,037,354, issued Apr. 14, 1936; No. 2,039,942, issued May 5, 1936; and No. 2,062,951, issued Dec. 1, 1936.

While each of the above patents shows a spherical combustion chamber located in one side of the cylinder, none of them shows a round combustion chamber located partly in the piston and partly in the cylinder, nor do they show the tops of the piston and of the cylinder located at an angle to the axes thereof.

SUMMARY OF THE INVENTION

In general terms, the invention may be briefly described as comprising an internal combustion reciprocating engine, each cylinder of which and the piston therein have their tops located at an angle to the axes thereof. The cylinder head is located at the same angle.

A round, preferably spherical, combustion chamber is formed partly in the long side of the piston and partly in the adjacent side of the cylinder near the top thereof. A spray nozzle is provided for spraying liquid fuel into the combustion chamber, and a spark plug, glow plug, cold plug, hot spot or pin, any of various kinds of catalysts or other means of artificial ignition is located in the combustion chamber in position to ignite the fuel spray during the early part of the fuel injection period.

The spray nozzle is so disposed that the fuel spray does not come into contact with the relatively cool combustion chamber walls. The fuel must be ignited at the proper time and mixed with the combustion air at the right time and rate to unite the entire amount of fuel with nearly the entire amount of available oxygen. All this must be done in a very small fraction of a second, about 0.001 second at 3,000 r.p.m. This is a colossal mixing operation in a very short time.

The problem is thus resolved into two principal subjects:

1. The spraying and mixing of the fuel with the combustion air at the right time and rate to utilize sensibly all of the combustion oxygen.

2. Ignition of the fuel spray as it enters the combustion chamber in a manner that will not foul or poison the ignition means.

The problem of mixing the fuel with combustion air has been a nemesis for most attempts at development of compression ignition engines. It has been demonstrated that the principal requirement for success is turbulence of the combustion air to a much greater extent than the carburetor requirements where fuel is more volatile and less cohesive. The directional flow of air into the cylinder by using a weir or lip on the inlet has many obstacles for continuity of operation, as also the interference with good breathing.

The only moving part to generate air turbulence is the piston which forms part of the combustion chamber walls. By placing the combustion chamber partly in one side of the cylinder, the piston covers the passageway as it travels up and pushes the combustion air from the cylinder into the combustion chamber.

By running the piston to just barely mechanical clearance with the head, sensibly all air is pressed into this spherical combustion chamber, tangentially, to produce a revolving motion which amounts to about five revolutions during the fuel injection duration.

In the four-cycle engine, the air inlet is at the right or higher side of the head, as viewed in FIG. 1, and the exhaust is on the left or lower side thereof. Inlet and exhaust valves are located side by side for admitting air to the combustion chamber and cylinder and exhaust gases therefrom, respectively. Each valve has a spring-loaded stem which normally holds the valve in closed position, and a pivoted rocker arm is associated with each valve stem and cooperates with the camshaft of the engine opening the valves at the proper times.

The invention is also adapted to two-cyle engines and may be of either a uniflow-type or loop scavenging-type of two-cycle engine. In either case the tops of the cylinder and piston would be angled as above described with the cylinder head located at the same angle.

A spherical combustion chamber would be provided, approximately half in the side of the piston and half in the adjacent side of the cylinder, to form a port inlet air diverting lip or weir. In the uniflow-type of two-cycle engine the exhaust valve stem would be spring-loaded to normally hold the exhaust valve in closed position, and the upper end of the valve stem would be contacted by the camshaft. Combustion air is admitted through ports in the sides of the cylinder.

In the port scavenging-type of two-cycle engine there would be no valves, the air being admitted and the gases being discharged through open ports in the sides of the cylinder.

It is an object of the invention to provide an internal combustion reciprocating engine in which the mixing of a fuel spray and air in the combustion chamber is such that at least 95 percent of the oxygen in the combustion air is united with the fuel at the proper time and rate for greatest power and economy.

Another object of the invention is to provide an engine of this character with means for artificially igniting the fuel spray within the combustion chamber.

A further object of the invention is to provide such an internal combustion engine which will permit the optimum of compression ratio, about 11 to 1, for best power and economy.

A still further object of the invention is to provide an internal combustion engine of the character referred to which is so constructed and arranged that it will permit ease in starting when cold.

Another object of the invention is to provide an internal combustion engine of this type which will eliminate carbon monoxide gas in the exhaust.

A further object of the invention is to provide an internal combustion engine of this character which will eliminate the "fuel knock" which exists in all diesel engine due to rapidity of pressure rise when the fuel is ignited by the heat of compression.

It is also an object of the invention to provide such an internal combustion engine which will eliminate the time lag of ignition, about 0.0005 of a second, which exists in diesels or compression ignition engines at any and all r.p.m. and prevents the practical increase in r.p.m. of about 2,300 r.p.m. without excessive loss of thermal efficiency and/or excessive rate and amount of pressure rise with its attendant "fuel knock."

Another object of the invention is to provide an internal combustion engine of this type which provides for adaption of a compression ratio at the optimum for the greatest expansion ratio of the combustion gases while remaining within the boundaries of excessive dissociation losses, that is about 10½ or 11 to 1.

A further object of the invention is to provide an internal combustion engine of the character referred to in which there is a reduction in weight per horsepower as compared with diesel engines, because most parts, particularly cylinder block, head and flywheel, can be made similar to gasoline engines.

A still further object of the invention is to provide such an internal combustion engine in which the indicated mean effective pressure will be increased over both gasoline and diesel engines because of the higher expansion ratio of the combustion gases and lower losses from dissociation and also from better breathing ability.

Another object of the invention is to provide an internal combustion engine of this character producing greater power than diesels because of higher indicated means effective pressure and r.p.m. and lower friction, made possible because of lighter reciprocating parts, less compression and maximum pressure and fewer compression rings.

A still further object of the invention is to provide such an internal combustion engine in which there is a considerable reduction of the free colloidal carbon (black smoke) in the exhaust gases found in diesel engines, which is made possible by artificial ignition, thus eliminating the "cracking" of fuel molecules which occurs in a compression ignition engine and which "cracking" allows carbon atoms to conglomerate since they have an affinity for their own kind, but not for oxygen. Oxygen has an affinity for the carbon atoms as it also does for the hydrogen atoms, but the hydrogen atoms have an affinity for oxygen, whereby the hydrogen and oxygen hunt out each other and unite ahead of the carbon-oxygen union insofar as it is possible, although the oxygen is also carbon atom hungry and attaches itself thereto when convenient. However, the abundant carbon atoms, having an affinity for each other, gather into congregations and are absorbed by the oxygen one atom at a time, producing $CO_2$, which interferes with the process of other carbon hungry oxygen atoms for coming into contact with the carbon congregation to consume these atoms one at a time.

Another object of the invention is to provide such an internal combustion engine in which the logistics of fuel distribution will be clearly simplified, for only one specification of fuel would be required for all types of reciprocating internal combustion engines for use on the surface, in the air, and under the surface of the sea, also for household furnace heating.

Another object of the invention is to provide an internal combustion engine of this type which would be insensitive to internal carbonaceous deposits, as there would be no preignition from hot deposits in the combustion chambers and consequently no detonation from heat-of-compression combustion.

A further object of the invention is to provide such an internal combustion engine in which the piston rings service problem would be less than with present-day diesel engines and about the same as in gasoline engines.

A still further object of the invention is to provide an internal combustion engines of the character referred to in which the tops of the cylinders and pistons are located at an angle to the axes thereof, and in which the cylinder head is located at the same angle.

Another object of the invention is to provide such an internal combustion engine in which the combustion chamber is round and is located at one side of the cylinder, partly in the piston and partly in the cylinder.

These and other objects, apparent from the drawings and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principles, being set forth in detail in the following description and illustrated in the accompanying drawings.

BRIEF DESCRIPTION OF THE DRAWINGS

FIG. 1 is a vertical sectional view of the upper portion of a cylinder and a cylinder head of a four-cycle, internal combustion, reciprocating engine embodying the invention;

FIG. 2 is a diagram of a cylinder, cylinder head, valves and combustion chamber of the engine to which the invention pertains;

FIG. 3 is a section on the line 3-3, FIG. 1;

FIG. 4 is a section on the line 4-4, FIG. 3;

DESCRIPTION OF THE PREFERRED EMBODIMENTS

Figure 8:
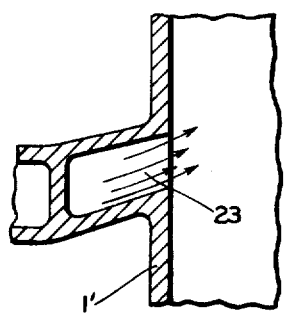
FIG. 8 is a section on the line 8-8, FIG. 7.

Referring first more particularly to the four-cycle engine shown in FIGS. 1 to 4 inclusive, in which similar numerals refer to similar parts throughout, the upper portion of a cylinder is shown at 1, a portion of a conventional water jacket at 2, a piston at 3, and the cylinder head is indicated generally at 4.

This engines differs from conventional reciprocating internal combustion engines particularly in that the upper end of the cylinder is located at an angle to its axis as indicated at 5, and the upper end of the piston is located at the same angle as indicated at 6. The cylinder head 4 is also located at this angle.

The combustion chamber 7 is substantially round, preferably spherical, although it may be disc-shaped, drum-shaped, or cylindrical. A spherical swirl chamber is preferred to a disc or drum-shaped because it provides more circumference for the fuel spray of a pintle-type spray nozzle. The disc-shaped combustion chamber usually requires a multiple orifice nozzle with two or more holes normal to the disc axis, and these small holes or orifices are more difficult to maintain in condition than the pintle-type nozzle. However, it can be made successful.

The centrifugal velocity in the sphere, with air at the density of the fuel injection period, renders the density at the outer periphery greater than that of the fuel droplets. This status aids in preventing fuel droplets and vapors, from the spray, from coming into contact with or near the combustion chamber walls until they are gasified and wholly or partially united with oxygen. Otherwise, the exhaust will have a blue smoke and foul smell. Moreover, carbonaceous deposits may accumulate on the combustion chamber walls.

The combustion chamber 7 is an improvement upon the Treiber patents' combustion chamber and is intended to reduce the surface volume ratio, increase the percentage of air confined in the sphere and increase its centrifugal velocity, also to eliminate the cylinder wall heat abuse adjacent to the combustion chamber by making the top of the piston at an angle so that the bottom of the sphere is above the piston rings and thus permits better cylinder wall cooling. The angle of the piston top is matched with this same angle of the cylinder top so that the head is also at this same angle.

Also, the inlet and exhaust valves, being nearly flush with the bottom of the head, may be increased in diameter to provide better breathing. Although the surface-volume ratio of the combustion chamber is slightly increased, the gain in breathING, thus increasing the power capacity, far outweighs the small added loss of radiation. It provides an engine of much greater power capacity for no more cost of construction. The power gain should be at least 16 percent which is only 20 percent of the increase in inlet port area over a conventional type head.

The total increased width available for both valves is proportional to the secant of the angle plus the overlap on the combustion chamber. The location of the inlet valve, partly over the combustion chamber, not only gives added breathing area but also directs the breathing, in part, through the combustion chamber to aid in cooling these areas including the adjacent cylinder wall.

The arrangement of valves at the side of the cylinder head instead of in line with the crankshaft, which is the usual manner, coupled with their wider spread due to the angle and overlap, permits the camshaft to be located between the valve stems with symmetrical opposite side rocker arms swinging on a common rocker arm shaft above the camshaft. The camshaft may be driven form the crankshaft by belt, gears or chain.

This arrangement permits very low acceleration values of the valve operating mechanism with the absence of the push rods and tappets and thus provides a basically quieter engine. The maintenance is about equal or less than any conventional valve operating mechanism. The proposed location of the fuel spray nozzle is such as to direct the fuel spray toward the inlet valve which can be designed with respect to seat width to keep it hot enough to repel or gasify any fuel spray droplets that may penetrate the entire distance of the combustion chamber, in which case they will adhere thereto and accumulate a carbonaceous mass to interfere with good engine operation— even unto a failure.

The "lip" in the Treiber patents' combustion chamber was used to prevent this accumulation on the piston but it never was perfect, often resulting in scratched or scored cylinders by the carbonaceous mass pressing against the cylinder wall. The proposed execution will mitigate this objection, in fact, should eliminate it completely.

Also, the combustion chamber is located at one side of the cylinder, a portion 8 thereof being formed in the cylinder and the remainder thereof being formed in the piston, as indicated at 9. This forms a lip or weir 10 at the upper edge of the piston.

An intake port area 11 is formed in the cylinder head 4 and may communicate with a conventional intake manifold. An exhaust port area 12 is also formed in the cylinder head and may communicate with a conventional exhaust manifold.

The inlet valve 13 may be of conventional construction, and is normally held in raised or closed position by the coil spring 14. The exhaust valve 15 is also of conventional construction and is held in raised or closed position by the coil spring 16.

The camshaft of the engine is shown at 17, and above it is a rocker shaft 18 upon which are a pair of rocker arms 19 and 20 operated by the camshaft to open the inlet valve 13 and exhaust valve 15, respectively.

Each rocker arm 19 and 20 has a threaded aperture 24 in its upper end, through which is located an adjusting screw 25 having a nut 26 upon its upper end. A ball 27 is formed in the lower end of each adjusting screw 25 and fits into a socket 28 in the flanged cap 29 of the valve stem. Shoes 30 are formed upon the lower ends of the rocker arms 19 and 20 for contact with the cams 31 upon the camshaft 17.

One or more of many means of ignition may be located in the combustion chamber 7, such as a spark, stream of sparks, hot sparks, glow plug, cold plug, torch, hot spot or pin, or catalysts of various kinds. For the purpose of illustration, a conventional spark plug 21 is shown.

For the purpose of injecting liquid fuel into the combustion chamber, a fuel spray nozzle 22 is provided and is so located as to direct the spray of fuel away from the relatively cold walls of the combustion chamber and toward the inlet valve or cylinder head.

A heat shield 22a of high heat flow material is located around the nozzle holder and nozzle 22 from outside the cylinder to the combustion chamber and extends over the inner end of the nozzle tip with a hole in its center for the fuel spray to pass through, as shown in FIG. 1.

The fuel injection and proper spray pattern, point of injection, duration of injection, distribution of fuel and velocity of fuel spray are relatively simple problems because fuel injection equipment is quite well developed.

The problem of mixing the fuel with the combustion air is considerably more difficult to solve. It has been demonstrated that the principal requirement for success is turbulence of the combustion air to a much greater extent than the carburetor requirements where fuel is more volatile and less cohesive. The directional flow of air into the cylinder by using a weir on the inlet has many obstacles for continuity of operation as also the interference with good breathing. The only moving part to generate air turbulence is the piston which forms part of the combustion chamber walls.

The shape of a portion of the piston is commonly made to induce turbulence as also to form a combustion chamber. However, it has limitations in making a suitable combustion chamber that will give room to "shoot" the fuel spray and produce adequate and proper turbulence to utilize the high percentage of combustion oxygen (95 percent or more) at the proper time and rate.

Many combustion chamber shapes and fuel sprays have been tried and found wanting. One common objection is that they increase the surface-to-volume ratio so much as to reduce the thermal efficiency by added radiation of heat to the coolant. A compromise must be made, especially in high-speed, high-powered engines.

By placing the combustion chamber toward the side of the cylinder, at least partly in the cylinder, the piston covers the passageway as it travels up and pushes the combustion air from the cylinder into the combustion chamber.

The piston 3 is run to just barely mechanical clearance with the head 4, so that sensibly all air is pressed into the spherical combustion chamber 7 tangentially to produce a revolving motion which amounts to about five revolutions during the fuel injection period, thus doing a very good job of mixing fuel and air.

The fuel spray is partly bent toward the spark plug 21, or other ignition device, by the combustion air being pushed into the combustion chamber 7 where its leading edge is ignited and further combustion propagates as additional fuel is injected.

The combustion process starts at a predetermined point in piston travel and continues smooth and uninterrupted with additional turbulence on the downward stroke as the combustion products emerge from the combustion chamber to the space between the piston and cylinder head.

In FIGS. 5 to 8 is shown a uniflow type two-cycle engine embodying the invention. A cylinder is indicated at 1', a cooling jacket therefor at 2' and the piston at 3'.

As in the four-cycle embodiment of the invention, the top of the cylinder is located at an angle to its axis as indicated at 5' and the tip of the piston is located at the same angle as shown at 6'. The cylinder head 4' is also located at the same angle.

Figure 7:
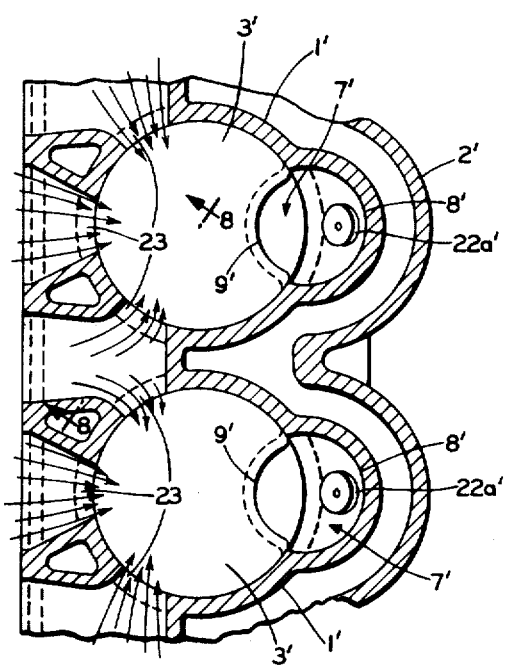
FIG. 7 is a section on the line 7-7, FIG. 5.
Figure 6:
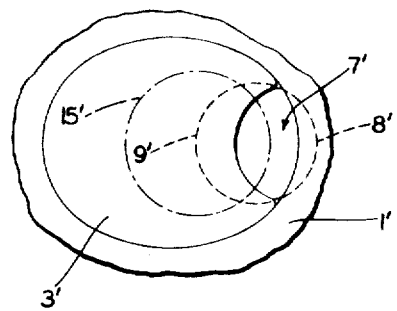
FIG. 6 is a plan diagram as on the line 6-6, FIG. 5.

The combustion chamber 7' is formed one-half in the cylinder as indicated at 8' and one-half in the piston as shown at 9'. There is no inlet valve, air being admitted from the outside through the three inlet ports 23, which are opened near the outward stroke of the piston to admit air under pressure above atmospheric pressure into the cylinder to scavenge the burned gas and recharge the cylinder with fresh air. One port 23 is directly opposite the combustion chamber with its inlet walls slanting downward, as shown in FIG. 7, and the other two ports 23 have their inlet walls slanting upward, as shown in FIG. 8. This permits the center inlet streams to pass into the cylinder between the piston and the two air streams from the other two inlet ports 23, as to meet each other and diffuse in directions to more perfectly scavenge the cylinder of gas as the air fills the cylinder and combustion chamber and pushes the burned gas out of the open exhaust valve or valves.

Figure 5:
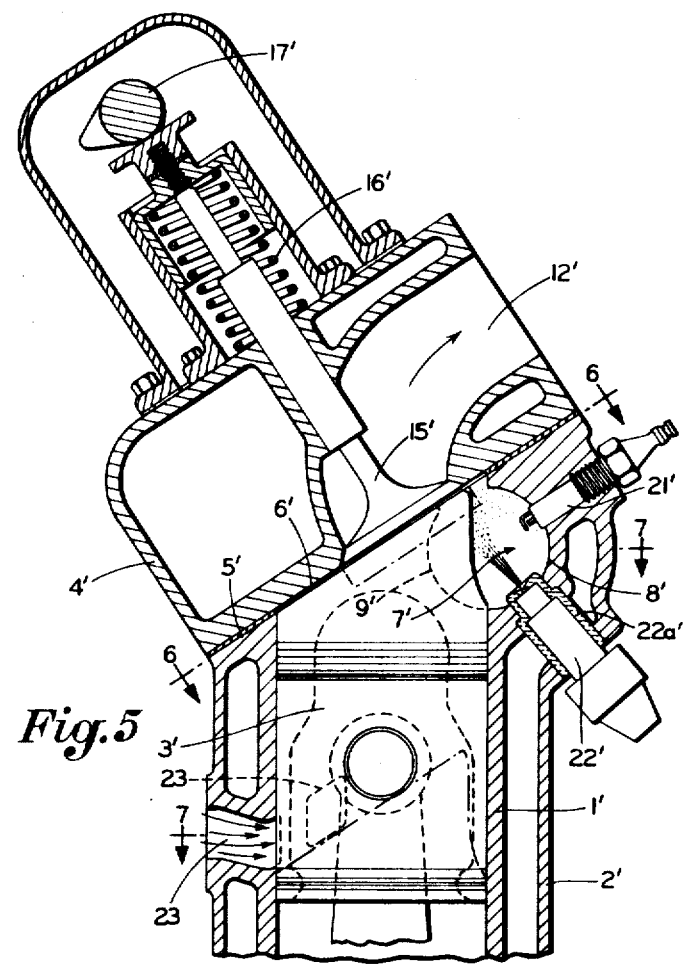
FIG. 5 is a vertical section of the upper portion of a cylinder and piston and the cylinder head of a two-cycle uniflow-type of engine embodying the invention.

The exhaust port area is indicated at 12'. There may be one or more valves, one of which is shown at 15'. The coil spring 16' normally holds the same in closed position as shown in FIG. 5. The exhaust valves are properly timed with respect to the crankshaft with any conventional mechanical means of opening and closing to provide an opening to the atmosphere for the burned gas to escape. The engine camshaft 17' depresses the exhaust valve 15' to open position at the proper time against the pressure of the spring 16'. A spark plug or other means of ignition, as indicated at 21', is located in the combustion chamber. A spray nozzle 22' is inserted into the combustion chamber to spray liquid fuel therein as above described and may be protected by a heat shield 22a' of high heat flow material, as described above in connection with FIG. 1.

Figure 10:
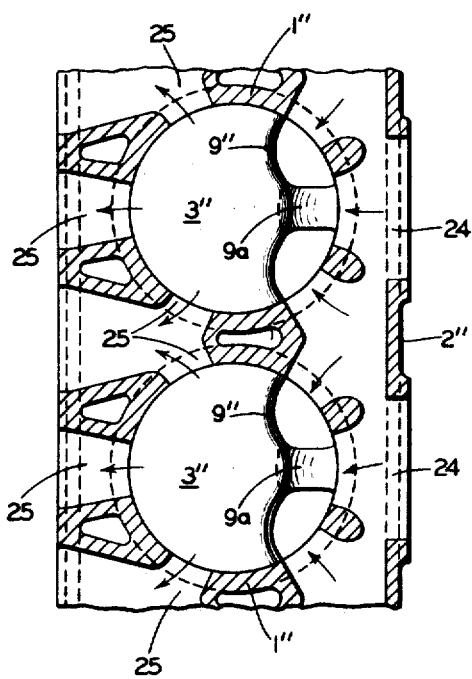
FIG. 10 is a section on the line 10-10, FIG. 9.
Figure 9:
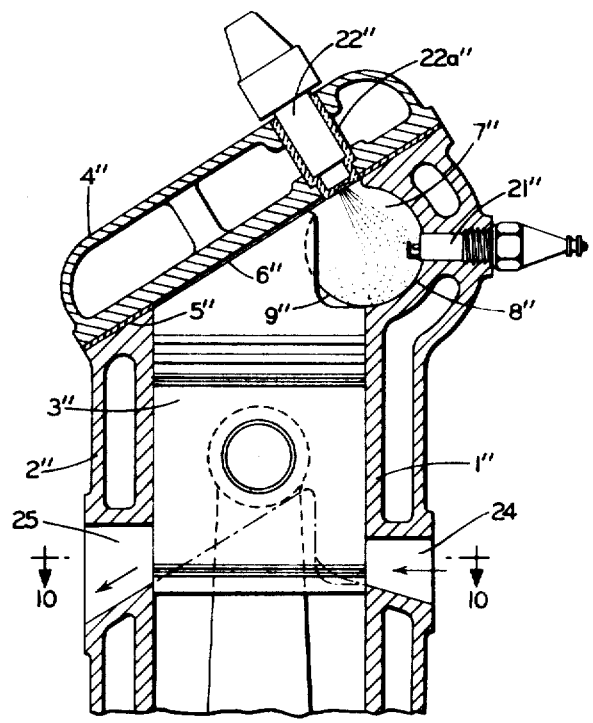
FIG. 9 is a vertical sectional view through the upper portion of a cylinder and piston and the cylinder head of a two-cycle loop scavenging-type of engine embodying the invention.
Figure 11:
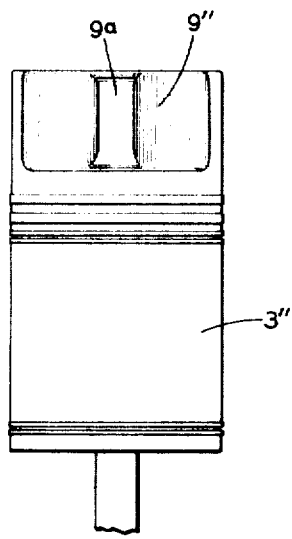
FIG. 11 is a detached side elevation of one of the pistons shown in FIGS. 9 and 10.

In FIGS. 9 to 11 inclusive is shown a two-cycle loop scavenging engine embodying the invention. The cylinders are indicated at 1" provided with a cooling jacket 2". Each piston 3" is of the shape shown in the drawings, the upper end being located at an angle as indicated at 6" corresponding to the upper end 5" of the corresponding cylinder. The cylinder head 4" is located at this same angle. The combustion chamber 7" is located half in the cylinder and half in the piston as indicated at 8" and 9", respectively.

As shown in FIGS. 10 and 11, the combustion chamber portion 9" in the piston is shaped to provide a baffle 9a to direct the inlet air streams toward the cylinder head and the cylinder portion of the combustion chamber from where the inlet air is "looped" across the cylinder against the cylinder head and along the cylinder wall to the exhaust ports to provide loop scavenging and recharging the cylinder with fresh air for the following compression stroke, fuel injection, ignition and power stroke pushing the piston outward to finally uncover the exhaust ports, and permit pressure blow down followed by the inlet ports being opened to again scavenge and recharge the cylinder.

A spark plug or other ignition means is inserted into the ignition chamber as indicated at 21", and a fuel spray nozzle 22", is inserted through the cylinder head into the combustion chamber and directed toward the spark plug or other means of ignition. The spray nozzle may be protected by a heat shield 22a" of the character above described.

This engine may be valveless, air being admitted through the intake ports 24 and the gases of combustion being discharged through the exhaust ports 25.

In the two-cycle-types of engine, the intake air would loop the cylinder and combustion chamber in port scavenging execution to provide good scavenging. The exhaust valves or ports and inlet ports may be located to provide some supercharging. A fairly high scavenging air pressure is contemplated, especially for high speeds and supercharging. As illustrated, the port scavenging engine would be valveless. Either one offers a possibility of producing a great deal more power than a nonsupercharged four-cycle engine of the same displacement.

However, it appears reasonable that the four-cycle engine may be sufficiently supercharged to nearly equal the power output of the two-cycle engine of similar displacement.

From the above it will be evident that an internal combustion reciprocating engine is provided in which a fuel spray and air are mixed in the combustion chamber so that a high percentage of oxygen, that is 95 percent or more, in the combustion air is united with the fuel at the right time and rate for the best power and economy, and in which the fuel spray is artificially ignited within the combustion chamber.

It will also be seen that the improved engine permits the optimum of compression ratio for best power and economy, about 11 to 1, permits ease in starting cold, and eliminates carbon monoxide gas in the exhaust.

Also, it will be obvious that the improved engine eliminates the "fuel knock" which exists in diesel engines due to rapidity of pressure rise when the fuel is ignited by the heat of compression.

Furthermore, it will be seen that it eliminates the time lag of ignition, about 0.005 of a second, which exists in diesels or compression ignition engines at any and all r.p.m. and prevents the practical increase in r.p.m. of about 2,300 r.p.m. without excessive loss of thermal efficiency and/or excessive rate and amount of pressure rise with its attending "fuel knock."

The improved engine also permits of reduction in weight per horsepower from diesel engines because most parts, particularly cylinder blocks, heads and flywheel, can be made similar to gasoline engines.

Also, the indicated mean effective pressure (IMEP) will be increased over both gasoline and diesel engines because of the higher expansion ratio of the combustion gases with lower losses from dissociation and also from better breathing ability.

The improved engine will develop greater power than diesels because of higher IMEP and r.p.m. and lower friction, made possible because of lighter reciprocating parts, less compression and maximum pressure and fewer compression rings.

There will be a reduction of free colloidal carbon, "black smoke," in the exhaust gases compared with in diesel engines, made possible by artificial ignition, thus eliminating the "cracking" of fuel molecules which occurs in a compression ignition engine.

I claim:

1. An internal combustion engine including a cylinder having a bore extending therethrough, a cylinder head having a substantially flat surface closing one end of the cylinder bore, a piston reciprocating in the cylinder bore, a substantially spherical combustion chamber formed partly in the sidewall of the cylinder and the remainder in the adjacent side of the piston when the piston is at the outer end of the stroke, said substantially spherical combustion chamber being tangential to the substantially flat surface of the cylinder head, said combustion chamber containing substantially all of the combustion air at the end of the compression stroke, there being an opening in the combustion chamber adjacent to said flat surface of the cylinder head forming a passageway from the spherical chamber to the cylinder bore when the piston is on its stroke before and after its outermost portion of reciprocation, suitable means for breathing air into and exhausting gas out of the cylinder, suitable means for admitting fuel into the combustion air in the cylinder and suitable means for igniting the air-fuel mixture.

2. An engine as defined in claim 1 in which the top of the piston and top of the cylinder and the bottom of the cylinder head are all located at the same angle to the axis of the cylinder whereby one side of the cylinder wall is longer than the opposite side and in which the combustion chamber is located on the long side of the cylinder wall.

3. An engine as defined in claim 1 in which the means for admitting fuel into the combustion air is a fuel spray nozzle positioned to direct the fuel spray into the combustion chamber clear of the piston and toward the cylinder head.

4. An engine as defined in claim 1 in which the means for breathing air into and exhausting gas out of the cylinder comprises an air inlet port and an exhaust port in the cylinder head and an inlet valve in said inlet port and an exhaust valve in said exhaust port.

5. An engine as defined in claim 1 in which the means for breathing air into the cylinder comprises air inlet ports in the sidewalls of the cylinder, said inlet ports being adapted to be opened near the outward stroke of the piston, and the means for exhausting gas out of the cylinder comprises an exhaust port in the cylinder head and an exhaust valve controlling said exhaust port.

6. An engine as defined in claim 1 in which the means for breathing air into and exhausting gas from the cylinder comprises an inlet port and an exhaust port located through the sidewalls of the cylinder.

7. An engine as defined in claim 1 in which there are three air inlet ports in the sidewalls of the cylinder, one of which is directly opposite the combustion chamber side with its inlet walls slanting downward toward the piston top when the piston is on its outer stroke, and the other two inlet ports arranged one on each side with their inlet walls slanting upward away from the piston to provide means for the center inlet stream to pass into the cylinder between the piston and the two airstreams from the other two air ports, which airstreams meet each other and diffuse in directions to more perfectly scavenge a cylinder of gas as the air fills the cylinder and combustion chamber and pushes the burned gas out of the open exhaust valve.

8. An engine as defined in claim 7 in which the means for admitting fuel into the combustion chamber is a fuel spray nozzle positioned to direct the fuel spray into the combustion chamber clear of the piston and toward the cylinder head, and in which the engine is of the loop scavenging valveless type with air inlet ports in the combustion chamber side of the cylinder which are uncovered near the outward stroke of the piston to admit air under pressure into the cylinder to loop toward the top of the cylinder through and in the cylinder to purge it of burned gas, and exhaust ports on the opposite side of the cylinder positioned to open near the outward stroke of the piston but before the inlet air ports open to permit pressure blow down before the inlet ports open.